Jan. 13, 1970   N. INCHAUSPE   3,488,921
PROCESS AND APPARATUS FOR ISOTOPIC ENRICHMENT
Filed Jan. 16, 1968   5 Sheets-Sheet 1

INVENTOR
NICOLAS INCHAUSPE
BY
Bacon & Thomas
ATTORNEYS

United States Patent Office 3,488,921
Patented Jan. 13, 1970

3,488,921
PROCESS AND APPARATUS FOR ISOTOPIC ENRICHMENT
Nicolas Inchauspe, Arthez de Bearn, France, assignor to Société Anonyme dite: Société Nationale des Petroles d'Aquitaine, Coubevoie, France, a corporation of France
Filed Jan. 16, 1968, Ser. No. 698,250
Int. Cl. B01d 56/26, 53/02
U.S. Cl. 55—66          14 Claims

ABSTRACT OF THE DISCLOSURE

The present invention is directed to a process and an apparatus for carrying out the process where a gaseous mixture of constituents of close molecular weights is enriched in one of its constituents. According to the process, the gaseous mixture is introduced into a chamber filled with a sorbing medium or an agent. The chamber is previously filled with a gas, referred to as a buffering gas, which is neutral with respect to the gaseous mixture and the sorbing agent. The gaseous mixture is maintained in the chamber until at least one fraction, referred to as the head fraction, is collected at the outlet. The injection of the gaseous mixture to be separated is stopped when the fraction has been collected. At that time buffering gas is introduced and the different fractions of the gaseous mixture are collected separately at the outlet of the chamber. The different operations of the process are preferably effected under conditions such that the retention capacity of the sorbing agent, determined by the volume of sorbing agent and the elementary sorption mechanisms, reaches a high value.

BACKGROUND OF THE INVENTION

It is known that a certain number of compounds occur in the natural state in the form of a mixture of several isotopic species. Because the different isotopic species possess great chemical similarities and generally differ slightly only in certain physical characteristics, it is most often very difficult to separate them. For particular industrial applications, it is nevertheless necessary to obtain, from natural isotopic mixtures, one of the isotopic species either in its pure or almost pure state or enriched with one of the interesting isotopes.

This is particularly true with respect to the elements of the Groups O, III, IV, V and VI of the Periodic Table and in particular with respect to boron 10 and 11 isotopes and the uranium isotopes having an atomic weight of 235 and 238. In order to effect such isotopic separations, there has mainly been employed heretofore a technique which consists in causing the isotopic mixture, brought beforehand into gaseous form, to diffuse through a porous wall and to use the difference between the diffusion speeds of the two isotopic species in order to obtain an enrichment.

In accordance with another known procedure, it was possible to use centrifuging arrangements in order to obtain an enrichment in one of the isotopic species, due to the fact that the centrifugal forces act differently on the two species, the atomic weights of which were slightly different.

Isotopic enrichment by a procedure referred to as isotopic exchange is also known. According to this procedure, a biphase equilibrium between two chemical species is carried out. The result is an isotopic equilibrium which is different from the initial conditions when the temperature is caused to vary. Thus a dithermal couple is achieved.

These enrichment procedures are always very small and it was observed that the enrichment phenomenon was directly connected with the adsorption phenomenon. The two isotopes have different adsorption constants. For example, for two isotopes of mass $M_1$ and $M_2$, there are two adsorption constants $A$ and $A+\Delta A$. It has been possible to measure the ratio $\Delta A/A$ in the laboratory as being equal to the relative variation of the isotopic ratio R represented by $$\rho + = \frac{R^0 - R+}{R^0}$$

By way of example, it has thus been possible to measure the ratio $\Delta A/A$ for the boron 10 and 11 isotopes. This ratio is approximately 0.02 in the case where a couple or pair comprising boron trifluoride-organic sulphides is used. It is 0.005 for the carbon 12 and 13 isotopes in the form of carbon monoxide and in contact with a molecular sieve. This ratio varies with the temperature.

Displacement chromatography wherein a gaseous mixture is introduced into a chamber filled with an adsorbent medium is also known. The mixture to be separated in this instance is injected into the filled chamber and the mixture is displaced by a gas which is more strongly adsorbed on the adsorbent medium than the most adsorbed of the constituents of the mixture. Chromatographic techniques such as this have been used for the separation of artificial mixtures of hydrogen, deuterium and tritium.

GENERAL DESCRIPTION OF THE INVENTION

The present invention relates to a process in which the ratio of the adsorption constant is multiplied by a large number, which permits considerable enrichment to be obtained. Accordingly the process can be repetitive and the enrichment can be brought to an optimum value thereby.

The process of the invention gives rise to an economic industrial preparation of artificial isotopic mixtures which are capable of yielding either pure isotopic species or mixtures having a concentration of a given isotope different from the initial mixture. The process has the additional advantage in that it can be performed in an extremely simple manner and with the assistance of relatively inexpensive equipment, while at the same time large quantities of isotopic mixture can be treated. As a result, the process according to the invention is particularly suitable for an isotopic separation on the industrial scale.

The present invention has for its object a process by which a gaseous mixture of constituents of close molecular weights is enriched in one of its consituents. The process is characterized in that the gaseous mixture is introduced into a chamber filled with a sorbing agent until at least one fraction, referred to as the head fraction, is collected at the outlet. The injection of the mixture to be separated is stopped when the aforementioned fraction has been collected. A gas, referred to as buffering gas and which is neutral with respect to the gaseous mixture to be separated and the sorbing agent, is then introduced and then the different fractions are collected separately at the outlet from the chamber.

According to one feature of the invention, the different operations are preformed under conditions such that the retention capacity of the sorbing agent contained in the chamber, determined by the volume of the sorbing agent and the elementary sorption mechanisms, reaches a high value.

In a preferred feature of the invention, the ratio between the retention capacity of the sorbing agent contained in the chamber and the volume of the collected head fraction is higher than 2.

It was found that with the sorption of the mixture of compounds of close atomic weights, such as the isotopes of the same element, an enrichment of the head fraction was obtained in a part of the mixture, at most, equal to about 20%.

Of course the invention can be used quite effectively where the gaseous mixture of constituents of close atomic weights is a mixture of isotopes of a single element as well as where the mixture of isotopes of the single element is a natural mixture of isotopes.

According to the invention, the sorbing agent is enclosed in a chamber which preferably has an elongated form and has in inlet orifice and an outlet orifice. According to one embodiment the chamber can be brought to a higher temperature, at the time the buffering gas is injected, than the temperature to which the chamber is subjected at the time of saturation by the isotopic mixture. Generally the buffering gas is a gas which is neutral with respect to the sorbing agent.

An alternative technique is directed to the method where the sorbing agent is filled with buffering gas prior to the injection of the isotopic mixture.

As will be evident from a closer consideration of the following description of the invention, various alternative techniques can be utilized among which can be mentioned:

(1) The isotopic mixture can be introduced into the sorbing agent at a rate such that the flow of the mixture into the sorbing agent is viscous;

(2) The isotopic mixture can be introduced into the sorbing agent at a constant rate;

(3) In a preferred embodiment, a purified gaseous isotopic mixture is used, that is, a mixture which has been freed to the maximum degree from the sorbable impurities which it may contain;

(4) An alternative embodiment provides that there are simultaneously collected in independent manner the head fraction, which is enriched with the species least fixed by the sorbing agent, and the tail fraction, that is, the fraction of isotopic mixture which is last to leave the column, which fraction is stripped of the species least fixed by the sorbing agent; while (5) In a more developed method there are successively and independently collected the head fraction enriched with the least fixed species, the heart fraction of which the mean isotopic ratio has scarcely varied and the tail fraction enriched with the most fixed species; or (6) The head fraction, the heart fraction and the tail fraction can be collected successively and independently and each of these fractions can then be subjected to a purification in which the respective fraction is separated from the buffering gas which may be admixed therewith.

It has appeared that the choice of the moments at which the commutations of the entry and outlet of the gases in three fractions are carried out, ensures the possibility of regulating the rate of enrichment of isotopes of different fractions within fairly wide limits around the value obtained by fractionating at the moment of the complete saturation of the column.

In one preferred method of carrying out this purification, the isotopic mixture is caused to pass into a chamber containing metallic parts which are cooled to a temperature which is sufficiently low for the vapor tension of the isotopic mixture to be very small. The chamber is then brought to a temperature where the isotopic mixture is in gaseous form.

According to the invention, at least one fraction of gaseous isotopic mixture enriched with one of the species which is leaving one stage can be injected into a second stage and the above process can be repeated, the different stages comprising the necessary connections; thus there is achieved a succession of unitary enrichment procedures with the aid of columns filled with sorbing agent and arranged in cascade formation.

In one embodiment of the isotopic enrichment in a cascade is achieved by (a) sending a gaseous flow of isotopic mixture to be enriched into a first chamber, (b) collecting the head fraction and sending the latter to the inlet of a second chamber, (c) collecting the heart fraction and sending the latter to the inlet of the said first chamber, (d) collecting the tail fraction and sending the latter to the inlet of a third chamber and (e) causing the respective fractions entering each chamber to undergo the treatment in accordance with the unitary process described above. Preferably the second and third chambers are located on either side of the first chamber with each bearing the necessary connections. According to this embodiment, a given chamber has introduced therein (i) an isotopic mixture originating from the head fraction of the chamber situated upstream in the cascade, (ii) an isotopic mixture originating from the heart fraction of the said chamber and (iii) an isotopic mixture originating from the tail fraction of a chamber situated downstream in the cascade.

As sorbing agent, there can be used an agent or medium capable of fixing, in a certain manner, a certain quantity of a gaseous compound, with the method of fixation of the gaseous compound on the said medium or agent being non-critical. The fixation can be reversible at a given temperature. It can also be irreversible at this temperature, and become reversible at a higher temperature.

It is appropriate to refer to the operation which consists in drawing off any fraction leaving a chamber so as to reinject it into the inlet of this same chamber as "recycling." On the other hand, the term "reflux" refers to the operation which consists in drawing off any fraction leaving a first chamber in order to then reintroduce it into the second chamber through its inlet, the second chamber being different from the first and situated upstream of the first chamber, relative of course to the direction of the increasing enrichment of the least adsorbed isotope.

By "purification," is defined the art of separating the isotopic mixture from the buffering gas in such a way that only the pure isotopic mixture is reinjected into the following stage.

"Following stage" designates the stage situated downstream of the stage in question, relative to the direction of the increasing enrichment of the least adsorbed isotope while "preceding stage" refers to the stage situated upstream of the stage in question, relative to the direction of the increasing enrichment of the least adsorbed isotope.

The terms "upstream" and "downstream" designate the direction of the increasing enrichment of the least adsorbed isotope to which reference is made.

"Rate of enrichment" is defined as the relative difference of the isotopic ratios of the said fraction and of the initial mixture. As described earlier, "isotopic ratio" refers to the ratio between the number of individuals of one isotopic species and the number of individuals of another isotopic species. It is thus desirable to increase as much as possible the rate of enrichment of one of the isotopic species when it is desired to isolate that particular species.

According to another method of effectuating the process according to the invention is to provide that the initial isotopic mixture is sent into a chamber containing the sorbing agent which is situated approximately at the middle of the cascade. This variation, in particular, makes it increasingly possible to strip, in the isotopic species which it is desired to separate, the tail fractions which are refluxed towards the chambers situated upstream of the chamber into which the initial isotopic mixture has been introduced. The cascade is thus separated into two parts by the supply chamber. One part provides for the enrichment of the least adsorbed isotope while the other provides for the enrichment of the most adsorbed isotope.

The two parts of the cascade are arranged in the following manner: the first stage, called the supply stage, is supplied with an initial mixture, the head fraction leaving this stage after purification is sent to the following stage, while the heart fraction after purification is reintroduced with the supply gas into the same supply stage, and the tail fraction, after purification, is sent to the preceding stage. Preferably the buffering gas is one from the group comprising the family of rare gases, the halogenated and preferably fluorinated compounds, and gases such as nitrogen or fluorine.

In a preferred form of the process, a head fraction comprising between about 1 and 40% of the isotopic mixture saturating the sorbing agent, is drawn off at the outlet from a sorbing agent chamber so that it can be injected into the sorbing agent chamber succeeding it in the cascade.

According to the invention, a tail fraction of the isotopic mixture comprising between 1 and 60% by volume of the isotopic mixture saturating the column can also be collected at the outlet from a chamber of porous sorbing agent, so that it can be refluxed to the inlet of the sorbing agent chamber preceding it in the cascade.

In one form of the invention, a sorbing agent having properties capable of bringing into use the vibration properties of the molecules of the different isotopic species is utilized for separating the different isotopic species. It is also possibe to employ a solid agent or medium which has been impregnated by means of a liquid, of which the molecule has at least one electron-exchanging atom, it being understood that, by "electron-exchanging atom," is meant an atom which is a donor or acceptor of electrons.

In one form of the process according to the invention, the porous sorbing agent filling the chambers is a powdered molecular sieve having a substantially homogeneous grain size, the diameter of the internal pores of said screen being between 3 and 100 A. This medium or agent is advantageously used for the separation of the isotopes of carbon, which isotopes are in a gaseous form, such as carbon monoxide. This agent can also be used for the isotopic separation of neon.

Alternatively, there can be used sorbing agents which are formed of solids in a finely divided form and of substantially homogeneous grain size, such as those defined by the general formula $H_xM_y$, in which H represents a compound from the family comprising halogens and M is a metal, $x$ and $y$ are integers. These agents can be used for the separation of isotopes of uranium, the latter being in the hexafluoride state.

In a third embodiment, a solid support in divided form and of substantially homogeneous grain size is employed, said support being impregnated by means of a liquid. In a variant of this third embodiment, the liquid used is an organic compound containing at least one electron donor atom, the concentration by weight of the organic compound being between 5 and 90% of the weight of the dry support. The electron donor atoms are selected from the group consisting of elements such as sulphur, oxygen, nitrgoen, selenium and tellurium.

According to one alternative of the above-described variation, the organic compound contains an electron donor atom and the remainder of the molecule is composed of at least one alkyl-aryl grouping, of which the number of carbon atoms is between 2 and 30. This variant can advantageously be used for the separation of isotopes of boron.

One method of carrying out the process, applied to a gaseous mixture, for example, an isotopic mixture, is as follows: Into a sorbing agent enclosed in a chamber and previously filled with buffering gas, there is introduced a single gaseous mixture under conditions such that there is sorption of the constituents of this mixture on the sorbing agent, which occurs at a constant rate. For the present instance, it is assumed that the introduction occurs at the moment 0. During a first period, the sorbing agent absorbs the gaseous mixture which pushes the buffering gas ahead of it. The molecules of the gaseous compound are fixed, causing the pressure drop in the column to vary. This first period lasts until one of the constituents of the gaseous mixture reaches the outlet from the column, which for example can be detected by a hot wire detector at the instant $t_R$. A certain fraction is allowed to pass until the instant $t_C$ in such a way that a desired enrichment fraction is collected. At the same instant $t_C$, the supply of isotopic mixture at the inlet to the chamber is replaced by the supply of buffering gas. For a certain time, the mixture which leaves the chamber under the pressure of the buffering gas is allowed to pass. This fraction is called the heart fraction. It has an isotopic ratio close to the isotopic ratio of the supply mixture. Thereafter, at the instant $t_E$, when the rate of flow of the isotopic mixture decreases at the outlet from the chamber, the outlet is switched over to a third reservoir and then the tail fraction is collected.

The ratio between the concentrations of the constituents in the unfixed gaseous phase, on the one hand, and the adsorbed phase, on the other hand, defines the sorption constant A.

The retention capacity $V_r$ of the chamber with respect to one gaseous constituent is defined as the saturation volume of the chamber with this volume being expressed under normal temperature and pressure conditions. The capacity $V_r$, measured under normal conditions, thus represents the volume of an entry gaseous constituent in the chamber when the front is detected. If now, instead of injecting a single gaseous constituent, there is injected a mixture of two gaseous isotopes of atomic weight $M_1$ and $M_2$, having sorption coefficients A and $A+\Delta A$, $\Delta A$ being small, there are observed two retention capacities $V_r$ and $V_r+\Delta V_r$, the mean value of these two values is later designated as V.

Consequently, a period exists during which the concentration of the compound with the sorption constant A in the mixture leaving the chamber is higher than the concentration of this same compound in the supply mixture. This can be verified by using a mass spectrometer.

At the instant when the outlet concentration, again becomes equal to the inlet concentration, there has been collected a volume $V^+$ of isotopic ratio $R^+$, different from the isotopic ratio $R_0$ of the initial mixture.

The rate of enrichment is defined by the relative variation of the isotopic ratio R. Now it is shown according to the invention that:

$$\rho + = \frac{R^+ - R_0}{R_0}$$

$$\rho + = \frac{V}{V^+} \frac{\Delta A}{A}$$

In other separation studies, $\Delta A/A$ was observed. On the other hand, applicant has discovered and used a process in which the elementary phenomenon is multiplied by an amplification coefficient $V/V^+$, in which process the amplification coefficient is regulatable by the volume drawn off, the volume of sorbing agent of the column and the elementary mechanisms determining the volume $V^+$.

Correlatively, it is observed that the tail fraction is stripped of isotope $M_1$ and is thus enriched in isotope $M_2$.

The present invention also has for its object the new industrial product which forms an arrangement intended for carrying into effect the process as described above, this arrangement being characterized by the fact that it comprises, in combination:

A chamber containing a sorbing agent having an inlet orifice and an outlet orifice preferably positioned at two opposite ends of the chamber; a first means permitting the successive introduction into the chamber of the isotopic mixture to be separated and a gas which is neutral with respect to the isotopic mixture and with respect to the adsorbing agent, this gas being hereinafter referred to as "buffering gas"; a second means permitting the gases leaving the chamber to be directed either towards at least one conduit intended for the collection of a fraction enriched in one of the isotopic species, or towards the supply conduit of the buffering gas or alternatively towards the supply conduit of the isotopic mixture; a third means for controlling the said first and second means at appropriate moments so as to enable the different fractions withdrawn from the isotopic mixture to be directed in their respective directions.

In one particular embodiment, the first means, placed at the inlet to the chamber, is formed by a changeover valve which is capable of being remotely operated, for example, by means of an electric remote control. The second means is formed by a changeover valve which can also be remotely controlled, this valve making it possible, as will be explained later, for the gases originating from the chamber to be directed into different conduits. The third means can be a detector of any appropriate type placed at the outlet from the chamber and sensitive to the variation in the composition of the effluent leaving the chamber. The detector preferably is formed by a catharometer which, as is known, is an arrangement comprising a heated wire, which is placed in the gaseous stream and the temperature variations of which are shown by variations in resistance. Such arrangements are very sensitive to the variation in the nature of the gases in which they are placed, because the nature of this gas has a considerable influence on the thermal equilibrium of the wire.

In addition, the third means can also contain a clock which is coupled to the detector and is capable of controlling the different suitable positions of the changeover valves at pre-regulated intervals after the appearance of the arrival front of the isotopic mixture leaving the chamber. Moreover, the detector can be replaced by a time base tripped by the isotopic mixture to be enriched which is being directed into the chamber.

As a result, the periodic introductions of isotopic mixture into the chamber and alternating with the introduction of buffering gas can be established by means of a clock and regulated as a function of the separation conditions which it is desired to obtain. This same clock can also serve to direct the gas originating from the chamber towards the different collectors, which occurs as a function of time, determined from the moment when the detector has been sensitized by the passage of the front of an isotopic mixture.

The present invention also provides for an apparatus which is formed by the aforementioned cascade which comprises a series of elementary arrangements, characterized by the combination of a series of chambers filled with a sorbing agent and placed in such a manner that the outlet of each chamber is connected by a system of conduits to a means ensuring the direction of the fraction leaving the said chamber towards:

The inlet of a chamber situated downstream of the said chamber,
The inlet of the said chamber,
The inlet of a chamber placed upstream of the said chamber,
A discharge conduit for buffering gases.

The inlet of the chambers are also connected to an arrangement which receives the different fractions, which originates from the various chambers, and the buffering gas, and to a central member which directs the gaseous flow to the chamber at moments defined by the cycle of the process and during regulatable periods of time.

The dimensions of the chamber containing the porous sorbing agent can be large. It is advantageous to use columns of cylindrical form, the length of which can be from about 0.5 and 15 meters and preferably from about 1 and and 5 meters, and of which the cross-section can vary from a few fractions of a square centimer to several square meters.

In one particular embodiment of the arrangement, a purification assembly intended for separating the isotopic mixture during the treatment with buffering gas is interposed on each of the gas-transporting conduits connecting the outlet of one chamber to the inlets of adjoining chambers. In one modified form, a purification assembly can be used for several different fractions.

DESCRIPTION OF THE DRAWINGS

The invention will be better understood from the following description, which is illustrated by the accompanying figures of the drawings.

The element described is for the separation of boron isotopes; however, as is apparent the mounting for the isotopes in any other element only involves modifications in detail and is usually identical with the arrangement indicated above. The number of elements for one cascade varies as a function of the contents desired at the outlets of the elements being investigated.

Figure 1:
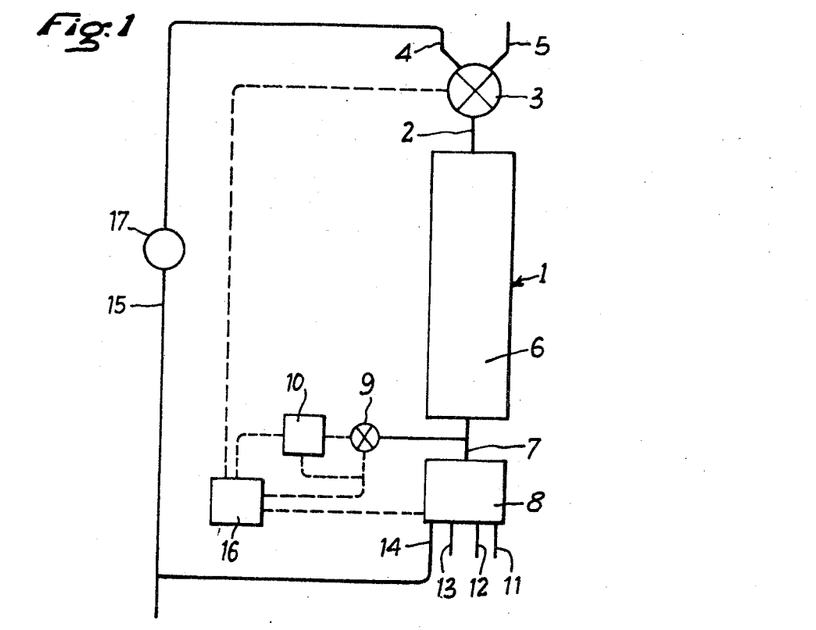
FIG. 1 represents a separator element, i.e. a chamber and its inlet and outlet elements.

Referring to FIG. 1, the reference 1 represents a chamber which is a monel column, for example, of cylindrical section. It is, of course, possible to vary the dimensions, but in this present example the column has a diameter of 15 cm. and a length of 3 m. Chamber 1 is filled with sorbing agent, which for example can be a baked clay dehydrated at 200° in a helium atmosphere on which has been fixed 30% by weight of dioctyl sulphide.

Chamber 1 is connected, on the one hand, to an inlet conduit 2, on which is connected a changeover valve 3. Valve 3 is connected to conduits 4 and 5 which serve respectively to supply the buffering gas and the isotopic mixture to be separated.

The separator medium is represented as 6 inside chamber 1. Chamber 1 is connected to an outlet conduit 7, of which the second end is connected to a changeover device 8 and an on-off valve or cock 9, the outlet of which is connected to a hot wire detector 10. The changeover device 8 is provided with four outlets 11, 12, 13 and 14, with the outlet 14 being for example, the buffering gas outlet, which is connected to a supply conduit 15 on which is arranged a circulating pump 17. The hot wire detector 10 is on the other hand connected to a clock 16, which controls the operation. Clock 16 is to control the positioning of the changeover chamber 8 so as to direct the flow of the different fractions leaving the chamber through the outlet conduit 7 towards the different conduits 11, 12, 13 and 14. The operation of this arrangement is as follows:

Before the instant 0, the buffering gas passes through conduit 4, changeover device 3 and conduit 2 into the chamber 1, the pores of the chamber being filled by the gas. This gas then passes through conduit 7 of the changeover device 8 and leaves again through conduit 14, thus ensuring a closed circuit. At the instant 0, the supply of buffering gas is shut off by changing over valve 3 and the isotopic mixture which is to be separated is introduced at a rate in the order of 200 cc. per second and passes along the following route. Entering via conduit 5, the mixture passes through changeover valve 3 and inlet pipe 2 and then proceeds into the interior of the chamber 1, where it saturates the sorbing agent and drives the buffering gas in front of it. The advance takes place along a front which is displaced towards the interior of the column and acts as a piston driving the buffering gas ahead of it. The isotopic mixture saturates the sorbing agent in which it is advancing. It thus participates in the replacement phenomenon of the molecules of the least adsorbed species by the molecules of the most adsorbed species and the phenomenon is continued as long as the chamber is not entirely saturated, that is, as long as molecules of isotopic mixture are not observed leaving the chamber through conduit 7 which molecules are detected by the catharometer 10.

At the instant when molecules are detected by catharometer 10, there is initiated the starting of the clock 16. The latter will give to the changeover device 8 an order which connects inlet 7 of the latter to outlet 11. For a certain time afterwards, clock 16 will change over valve 3 so that the buffering gas circulates afresh. Then, after a certain period, the clock modifies the position of the changeover device, which connects its inlet 7 to the outlet 12. After another time period, the clock brings the inlet 7 of device 8 into communication with outlet 13, and then, after a certain time, the clock connects the inlet of the device 8 to its outlet 14.

In one variation of the process, as soon as detector 10 has detected the arrival of the first molecules, shut-off cock 9 is closed, which effects the isolation of catharometer 10. Cock 9 is opened again when the changeover between inlet 7 of device 8 and its outlet 14 has been produced. These movements of the cock 9 are controlled by clock 16.

The different switching stages will be defined in connection with the description of the following figures.

Figure 2:
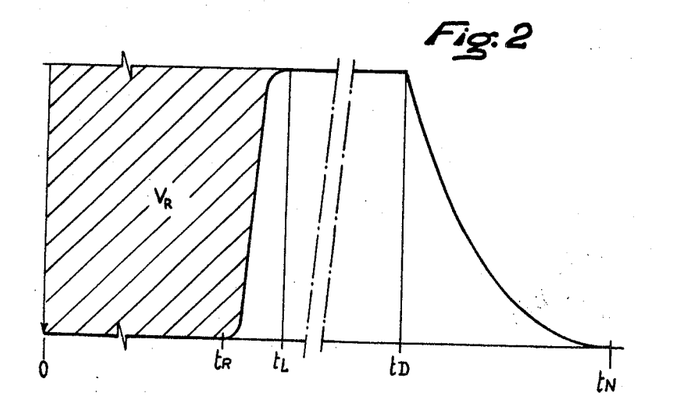
FIG. 2 shows diagrammatically the rates of flow observed at the outlet from the chamber as a function of time.

FIG. 2 represents the rates of flow of the different gases at the position of the detector 10. If the instant 0 is taken at the moment of commencement, that is, the moment at which the changeover between the inlet of the buffering gas and that of the isotopic mixture is effected, the isotopic mixture saturates the column for a certain time, driving the buffering gas ahead of it. The first molecules of the isotopic mixture arrive at the detector 10 at the instant $t_R$, thus defining the retention volume, as described above. The instant $t_R$ is the instant of changeover between the circuit 7–14 of device 8 and the circuit 7–11 of the same device. The concentration of the isotopic mixture in the gas then increases so as to reach a maximum, which will remain constant for a given time. This maximum is reached at the instant $t_F$. At the latest at this instant, the valve or cock 8 is changed over between 7 and 12 and the isotopic mixture then flows, whereafter the concentration of the latter in the buffering gas decreases from the instant $t_D$, and from this instant, valve 8 between 7 and 13 is changed over. The initial gaseous mixture has completely departed at the instant $t_N$ and the switching over of 7–14 takes place at this instant.

Figure 3:
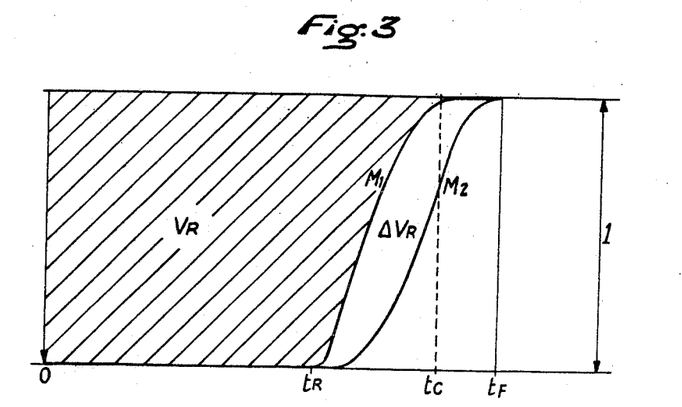
FIG. 3 represents the rates of flow of two isotopes of atomic weight $M_1$ and $M_2$ at the outlet from the column and as a function of time.

FIG. 3 represents a part of FIG. 2, in which is specified the time which is between $t_R$ and $t_F$. The instant 0 corresponds, in the same way as in FIG. 2, to the commencement of the injection of the isotopic mixture. The instant $t_R$ corresponds to the appearance of the first molecule of isotopic mixture at the position of the detector 10. The instant $t_F$ corresponds to the maximum and constant concentration of the isotopic mixture. The first curve $M_1$ is the arrival of the first front of molecules of species $M_1$; this is, for example, the arrival of the molecules of the 11 isotope of boron. A second front is observed, and this is called $M_2$, which corresponds to the arrival of molecules of the species $M_2$; it is, for example, the arrival of molecules of the boron 10 isotope. Between the instant $t_R$ and the instant $t_F$, there is effected the shutting off of the head fraction at an instant $t_C$. This is achieved by the changeover between the inlet 7 and the outlet 12 of the device 8. This instant $t_C$ is adjustable and enables head fractions of the isotopic mixture of greater or lesser enrichment to be obtained. If the instant $t_C$ is chosen to be very close to $t_R$, a mixture highly enriched with $M_1$ isotope is obtained, but a small enriched quantity, while if $t_C$ is caused to coincide with $t_F$, the enrichment of the mixture is smaller, but the enriched quantity is much greater.

Figure 4:
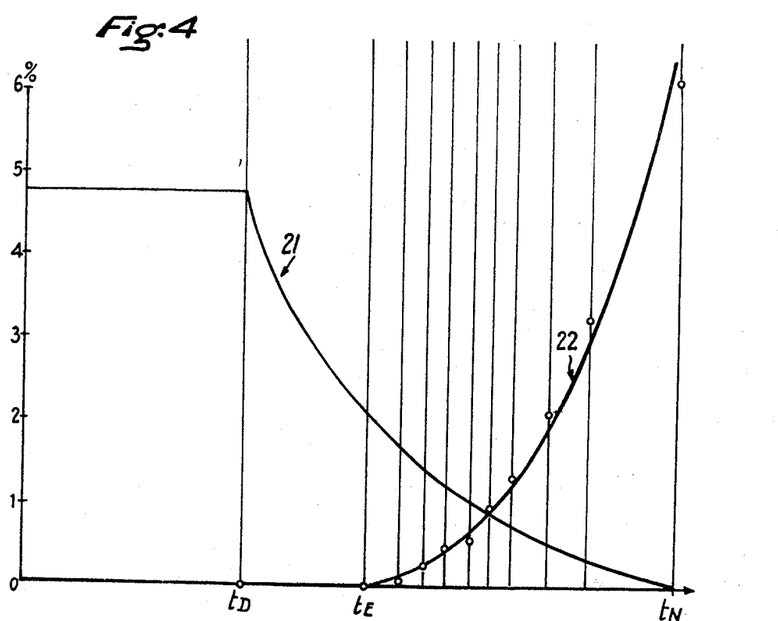
FIG. 4 represents the isotopic enrichment observed during the desorption phenomenon.

FIG. 4 represents the part between $t_D$ and $t_N$ of FIG. 2. In this figure, curve 21 represents the concentration of the isotopic mixture which alone leaves the chamber until $t_D$, whereafter it is mixed with the buffering gas between the times $t_D$ and $t_N$.

The instantaneous quantity of isotopic mixture leaving the chamber decreases in accordance with a roughly exponential curve law. A stripping is observed in this isotopic mixture tail and this is plotted in FIG. 22. This stripping, found experimentally, varies from 0 to 6%.

In the case of carbon monoxide, the corresponding values have been plotted as ordinates on the curve and are indicated as a percentage.

Figure 5:
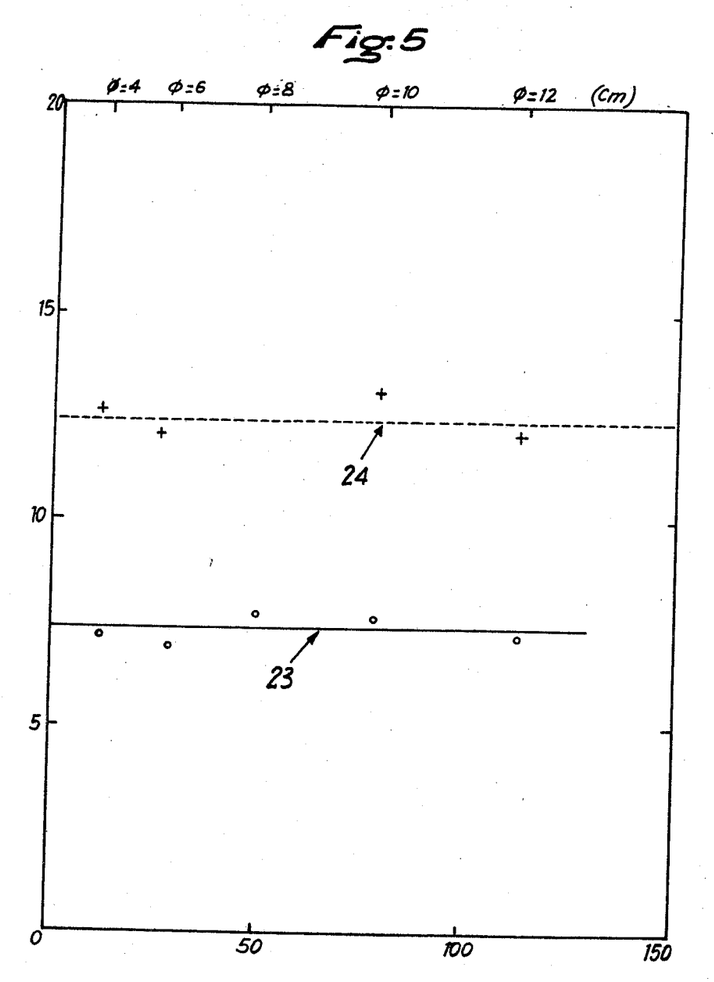
FIG. 5 represents the enrichment and the amplification factor observed as a function of the section of the chamber.

FIG. 5 represents experimental curves found during experiments carried out with carbon monoxide. The straight line 23 represents the variation in the enrichment rate of the head fraction, measured as being $$\rho + = \frac{R^+ - R_0}{R_0}$$

as a function of the section of the column.

This straight line is substantially a straight line parallel to the axis of the abscissa and shows that the enrichment rate of the head fraction is largely independent of the section of the column. The experimental points which were found are shown by circles. These circles are close to straight line 23. Straight line 24 represents the variation of the amplification coefficient $V/V^+$, as it is obtained from the formula:

$$\rho + = \frac{V}{V^+} \frac{\Delta A}{A}$$

as a function of the section of the column.

The experimental values found for the amplification factor of the elementary phenomenon obtained by using the process according to the present invention are represented by crosses. This amplification factor is substantially independent of the column section.

Figure 6:
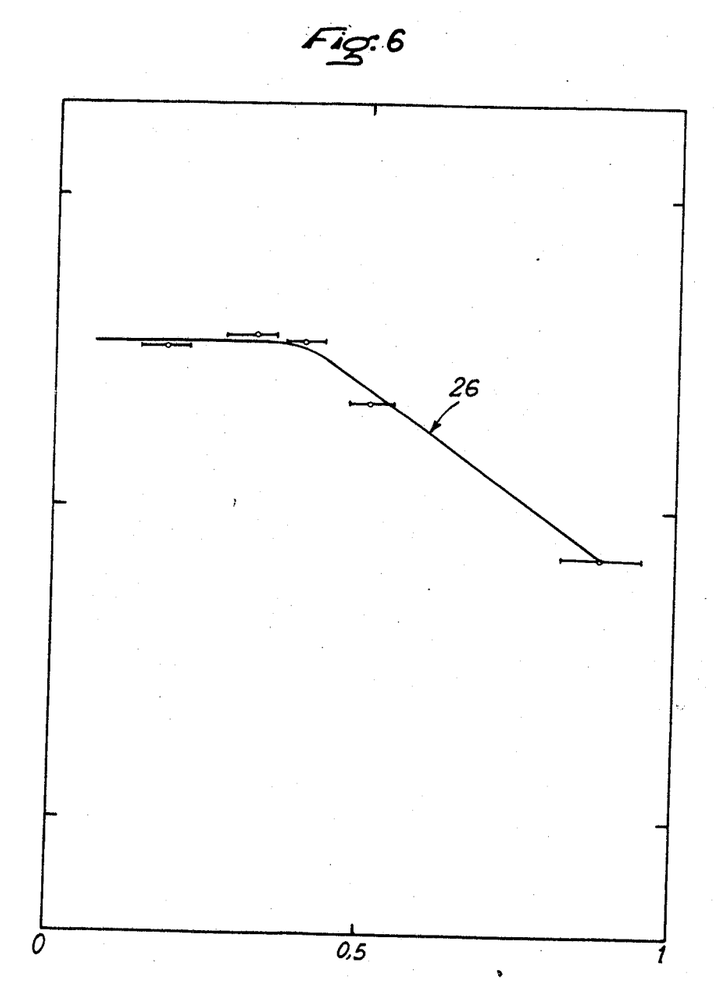
FIG. 6 represents the enrichment factor as a function of the diameter of the grains.

FIG. 6 represents the curve 26, which is a variation of the enrichment factor as a function of the grain diameter of the sorbing agent. It is seen in particular that the enrichment factor remains constant for grains with a diameter smaller than 0.5 mm., and then substantially decreases afterwards.

Figure 7:
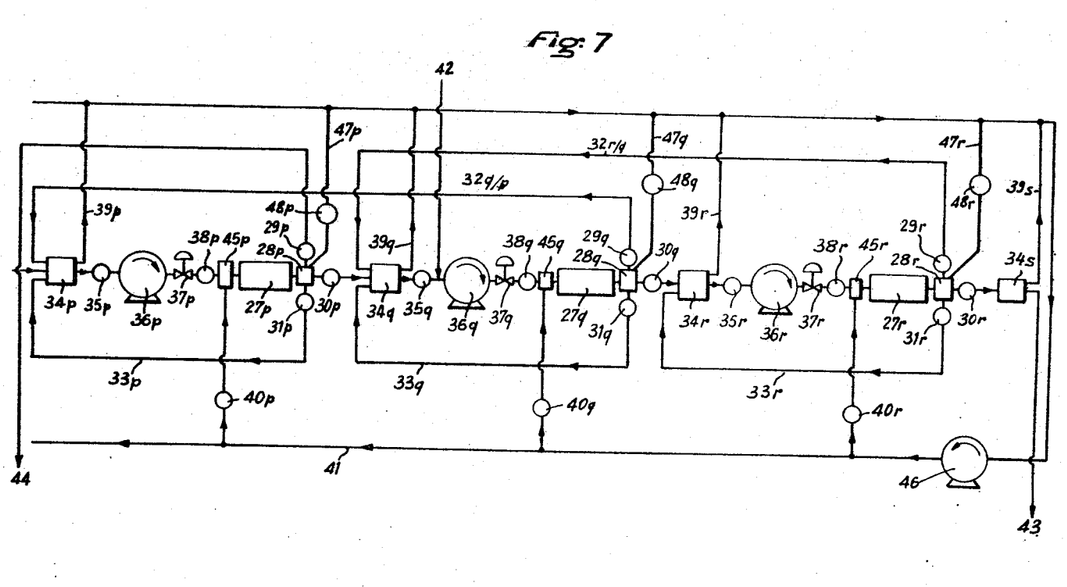
FIG. 7 represents diagrammatically an installation of three elements forming a part of the cascade.

FIG. 7 represents a cascade comprising three separator elements in series. These three elements are called respectively: element $p$—element $q$—element $r$.

In a complete chain, they would be connected to an element "$o$" situated upstream and an element situated downstream. In a circuit 41, the buffering gas is set in motion by pump 46. The isotopic mixture is injected via circuit 42, which is the supply circuit. This circuit reaches the inlet side of a pump $36q$. The delivery side of the pump is conected to constant pressure device $36q$, to cock $38q$ and changeover device $45q$, which is in direct communication with chamber $27q$ containing the separator medium. The outlet of this chamber is element $28q$.

The valve $38q$ is opened by a clock device which is controlled by a detector in the same way as described in connection with FIG. 1, representing the elementary stage. This valve or cock $38q$ is connected to changeover device $45q$, which is connected to the column $27q$; similarly, the device $35q$ is connected to a conduit bringing the buffering gas of circuit 41 through changeover valve $40q$. Valves $38q$ and $40q$ function in a coupled manner, so that while one is open, the other is closed, and vice versa.

In a first phase, valve or cock $38q$ is opened and the isotopic mixture is injected into chamber $27q$. After a certain time, the first molecules of isotopic mixture reach $28q$ and the head fraction leaving the separator element 27q is collected. This fraction is then directed into the trapping element 34r, where it is separated from the buffering gas, which returns through conduit 39r to the general conduit system for buffering gas 41.

At the instant $t_C$, valve 30q is closed and valve 31q is opened. The heart fraction of the isotopic mixture is then sent to trapping element 34q in order then to be recycled into the element "q." At the instant $t_E$, valve 31q is closed and valve 29q is opened, and then the remaining isotopic mixture is sent through piping system 32 to trapping element 34p in order thereafter to be treated in the element "p."

At the instant $t_C$, valve 38q has also been closed and valve 40q simultaneously opened, so that the isotopic mixture present in chamber 27q is pushed forward by the buffering gas, thus enabling the two heart and tail fractions to be collected.

After the instant $t_M$, valve 29q is closed and valve 48q is opened, which connects arrangement 28q through piping system 47q to the general piping system of the buffering gas 41. The stream of buffering gas thus passes through the chamber for a time which can be in the order of a few minutes.

The elementary operation on element q is then terminated. The operations on elements p and r proceed in the same manner. The three operations on p, q and r can take place in synchronism. The operations previous to a new cycle consist in reheating the purification elements 34p, 34q, 34r, and once the isotopic mixture is in gaseous phase, valves 35p, 35q, 35r are opened. The isotopic mixture is then compressed by pumps 36p, 36q, 36r and injected into the chambers at a new instant o, which determines the commencement of the enrichment cycle. This instant o is determined by the instant when valves 38q, 38p, 38r are opened and valves 40p, 40q, 40r are closed. Once the functioning of the cascade has been established, that is, after a few filling cycles, the fractions enriched and stripped in each two isotopes are collected at the two ends of the cascade at 43 and 44, respectively. The content of the isotope desired in each of these two fractions is a function of the number of stages in the cascade, a function of the withdrawal time, that is, the time elapsing between the instant $t_R$ and the instant $t_C$ and the time elapsing between the instant $t_E$ and the instant $t_N$. By appropriate regulation of these two times (withdrawal time of the head fraction and withdrawal time of the tail fraction), there is obtained a means for producing best results with the cascade, and knowing the isotopic ratio of the injected mixture and the isotopic ratio desired at the two ends of the cascade, makes it possible to establish, taking into account performances of an element, the number of elements of the cascade necessary for the proposed operation and the total volume of the installation.

SPECIFIC EMBODIMENTS

In order to illustrate the process described above, the isotopic enrichment of several mixtures will be described by way of non-limiting examples.

Example 1

A. The isotopic enrichment of carbon monoxide is carried out. For this purpose, a 5 A. molecular sieve supplied by Union Carbide is used. This sieve is ground to form grains with a diameter which is between 0.14 and 0.28 mm., whereafter it is dehydrated for 15 hours under helium atmosphere at 200° C.

A copper chamber with an internal diameter of 4 mm. and a length of 3 meters is filled with this sieve. The chamber is kept at 22° C. The chamber is filled with helium and then, at the instant 0, carbon monoxide is injected at a rate of about 1 cc. per second.

If things are left as they are, the rate of flow varies slightly of its own accord. This rate of flow can be regulated by adjusting an orifice. After 550 seconds, the appearance of carbon monoxide which has driven the helium from the column is detected by means of a catharometer placed at the column outlet. The rate of flow of the carbon monoxide is stablized at 565 seconds after commencing the injection. This results in a volume of retention capacity of 426 cc.

If fractions leaving the chamber are drawn off from the instant +550 seconds, it is established by analysis by mass spectrometry that these fractions are enriched with carbon 12. This variation in ratio lasts from the instant +550 seconds to approximately the instant +590 seconds. After this instant, the isotopic ratio has reassumed its initial value.

It was possible to measure in this example the following characteristic values:

$\rho^+ = 7\%$ (enrichment factor)
$V^+ = 30$ cc. (enriched quantity)
$V/V^+ = 14.2$ (amplification coefficient)

370 cc. of carbon monoxide, of which the isotopic ratio had not varied, was left to be desorbed, and then 150 cc. of tail fraction was collected and stripped of carbon 12. The stripping factor was about 1% and the amplification factor was 2.

B. Other examples of isotopic separation of carbon monoxide on a molecular sieve were produced by causing the temperature to vary and maintaining the other conditions constant. The retention volume and, concurrently therewith, the retention time vary substantially as the converse of the logarithm of the absolute temperature below 30° C., and then in accordance with the same law, but of different slope above. It is possible to work between −100° C. and 100° C.

There is little variation in the amplification coefficient, this being between 13.5 for 100° C. and 15 for −100° C. and increasing almost regularly when the temperature falls.

Taking the same pair of carbon monoxide and molecular sieve, it is possible to vary the diameter of the constant length column, the length of the column with constant section and at the same time the length and diameter with constant volume, and finally the rate of flow of carbon monoxide. It is possible to cause the column length to vary from 0.75 m. to 9 m., the circulation speed of the carbon monoxide being 16 cm. per second at the outlet of the column when the column is saturated.

The following phenomena were observed: the retention volume increases with the length of the column less than linearly; the enriched quantity $V^+$ only increases slightly, passing from 25 cc. for a column of 0.75 m. to 55 cc. for a column of 9 m.; the enrichment factor passes from 3 to 11%; the relative spacing of the sorption coefficients remains constant.

While keeping the size of the column constant, the section of the column has been caused to vary from 3 mm.² to 5 dm.². It was observed that if the speed of the carbon monoxide was increased, the enrichment factor varied little as a function of the diameter of the column. On the other hand, if the rate of flow was kept constant, the enrichment remained constant.

The quantity of enriched gas increased with the section. For a chamber of 1.14 dm.², 30 liters of gas were obtained, for which the enrichment coefficient was 8%.

It was observed that the retention volume decreased when the rate of flow increased. It was shown that the phenomenon was connected with the mean pressure variation in the column, the variations in rate of flow being necessarily caused by pressure variations, all other things being equal. It was found that the enriched volume increased the rate of flow of carbon monoxide, but that the enrichment coefficient decreased slightly, passing from 8% for an output speed of 8 cm. per second to 5% for 80 cm. per second.

Example 2

A. Another enrichment of the carbon monoxide was carried out on the molecular sieve (described in Example 1) under the following conditions: a column with a diameter of 4 mm. and a length of 3 m. equipped with a 5 A. molecular sieve of a grain size between 0.42 and 0.50 mm., kept at −125° C. The rate of the carbon monoxide in a saturated column, measured at the outlet, was kept constant and equal to 1 cc. per second. The retention capacity under these conditions was about 2500 cc.

| | | |
|---|---|---|
| Retention time | seconds | 2570 |
| Enrichment factor | percent | 14.6 |
| Enriched quantity | cc | 220 |
| Amplification coefficient | | 11.4 |

In collecting only the first part of the head fraction of 10 cc., the enrichment was 38%.

The retention capacity being the same as above, the amplification factor was then 250.

B. The enrichment defined above is the unitary enrichment. Several unitary enrichment stages can be coupled together and the enrichment phenomenon increases with the number of stages. For example, when a cascade of 5 unitary stages with a central supply is used at −125° C. in accordance with the cascade process and under the conditions as defined above, carbon monoxide was obtained of which the content of 12 isotope at the outlet was 99.7%.

At the other outlet, carbon monoxide was obtained of which the content of 13 isotope reached about 2.9%. Under the least satisfactory conditions, the content of 13 isotope exceeds 1.6%. It should be remembered that the natural ratio is about 98.9% of 12 carbon and 1.08% of 13 carbon.

Example 3

Tests for the enrichment of neon into neon 20 and neon 22 have also been effected.

There is given below an enrichment example of neon 20 of the mixture of the 20 and 22 isotopes of neon.

Working at the temperature of liquid nitrogen, 1 liter of neon was injected in 16 minutes into a chamber (diameter 0.4 cm., length 3 meters), filled with a molecular screen of the grain size between 0.3 and 0.4 mm. The buffering gas used was helium. At the outlet, 50 cc. of neon were collected, showing an enrichment of 40% in neon 20. The amplification factor thus obtained was 20.

It was possible to repeat the operation three times, for example, using as supply gas the gas collected at the time of the preceding operation. On completion of the third operation, a mixture of neon 20 and 22 was obtained, in which the content of neon 20 exceeded 98%.

Example 4

Another example is the enrichment in the 11 isotope of the mixture of the 10 and 11 isotopes of boron. The operation took place at 10° C. It was possible to verify that there was a maximum of enrichment as a function of the temperature and that this maximum is between −20° C. and +20° C. The enrichment operation was conducted in a Monel column of hexagonal section having a side of 1 centimeter. This column was filled with an inert medium, of which the grains have a diameter between 0.25 and 0.4 mm., impregnated with symmetrical octyl sulphite at the rate of 20 g. of octyl sulphite to 100 g. of "Chromosorb WAW." The injection was carried out in 16 minutes and 6.8 liters of boron trifluoride was injected at the rate of about 7.5 cc. per second. A head fraction of 0.6 liter was drawn off at the outlet of the column. This fraction had an enrichment of 32% of boron 11. The amplification factor under these conditions was 11.4.

It was also possible to draw off only 0.15 liter. The enrichment was then 50%. In the latter case, 0.15 liter of boron trifluoride was collected, and the content of 11 isotope thereof had passed from about 81% to 87%. Actually, the natural isotopic ratio was about 4.3 and it had become 6.5.

Example 5

Another example in connection with boron trifluoride can be given. It concerns the use of an enrichment cascade for boron 11.

The cascade is formed of three elements $a, b, c$. The element $a$ was the supply element. The section was 42 cm.² and its length was 4.50 meters. Element $b$ had a section of 28 cm.² and also a length of 4.50 meters. Element $c$ had a section of 14 cm.² and a length of 4.50 meters. The connection of these different elements was carried out in accordance with the cascade diagram, enrichment section. The quantities of gas undergoing treatment was the following for an operation carried out at 10° C.

*1st stage.*—Supply: 2.15 liters in 30 minutes; recycling of 1st stage, 14.1 liters in 15 minutes; reflux of 1st stage (rejection), 1.6 liters in 25 minutes; reflux from the 2nd stage to the 1st stage, 1.08 liters in 25 minutes; head fraction, 1.6 liters in 5 minutes. This fraction is enriched to 23%. The isotopic ratio has changed from 4.3 to 5.3.

*2nd stage.*—Fraction coming from the 1st stage, 1.6 liters; recycling from the 2nd stage, 9.5 liters; reflux from the 2nd stage towards the 1st stage, 1.08 liters; reflux from the 3rd stage towards the 2nd stage, 0.54 liter; head fraction collected, 1.08 liters, in which the isotopic ratio had changed from 5.3 to 6.5.

*3rd stage.*—Fraction coming from the 2nd stage, 1.08 liters recycling from the 3rd stage, 4.75 liters; reflux from the 3rd stage towards the 2nd stage, 1.08 liters; head fraction, 0.54 liter, in which the isotopic ratio had changed from 6.5 to 8.

540 cc. of boron trifluoride were thus drawn off, in which the concentrations of the two isotopes are respectively 89% of boron 11 and 11% of boron 10. The duration of the cycle is 1½ hours, comprised of: 30 minutes of injection, during which the head fraction was drawn off during the last 5 minutse, 15 minutes of withdrawal of the heart fraction produced by injection of nitrogen at 50° C., used as buffering gas; 25 minutes of refluxing at 50° C.; 20 minutes of cooling the element to 10° C.

Example 6

The isotopic enrichment of uranium: A column with a diameter of 4 mm. and a length of 3 meters is filled with sodium fluoride grains having a diameter of between 0.3 and 0.5 mm. The injection was carried out at 70° C. The entry pressure was 1.1 bars absolute and the rate of flow was 0.5 cc. per second. The injection is effected for about 1000 seconds. The retention capacity of the column was 450 cc. 40 cc. of uranium hexafluoride were drawn off at the outlet of the column. An amplification factor of 11 and an enrichment higher than 6% were determined. The buffering gas used was a mixture of nitrogen and fluorine. The heart fraction was collected at 400° C., as was also the tail fraction.

The characteristics of a cascade producing, from natural uranium, uranium which is enriched to 3.5% of the 235 isotope is given below by way of example. The rejection from this cascade was uranium containing 0.23% of uranium 235.

The reflux rate, that is, the ratio between the volumne of the tail fraction and the volume of the head fraction was 1.17 in the enrichment section and 0.95 in the stripping section. 30 stages were used, which were distributed as follows: an enrichment section of 15 stages and a stripping section of 14 stages with the two sections being connected by a supply stage. The volume of the enrichment section was about 300 times the volume of the last stage and the volume of the stripping section was about 460 times the volume of said last stage.

Obviously, many modifications and variations of the present invention are possible in the light of the above teachings. It is, therefore, to be understood that within the scope of the appended claims the invention may be practiced otherwise than as specifically shown and described.

I claim:
1. A process for enrichment of an isotopic mixture comprising a plurality of steps, each step being a combination of the following: injecting said isotopic mixture in a gaseous state into a first chamber filled with a sorbing medium having a retention capacity and a buffering gas which is inert with respect to said isotopic mixture and said sorbing medium, collecting a first fraction enriched with the least sorbed isotopic specie at the outlet of said first chamber, said first fraction being called the head fraction, injecting buffering gas into said chamber, collecting a second fraction containing an isotopic ratio substantially equal to the isotopic ratio which was present in the isotopic mixture injected into said first chamber, said second fraction being called the heart fraction, collecting a third fraction depleted of said least sorbed isotopic specie, said third fraction being called the tail fraction, causing said head fraction to undergo enrichment in a second chamber situated downstream from said first chamber, recycling said heart fraction to the inlet of said first chamber and refluxing said tail fraction to a third chamber situated upstream from said first chamber, all of these operations being called a cascade enrichment.

2. A process according to claim 1 wherein said first fraction which is collected comprises between about 1 and 40% by volume of the isotopic mixture which is injected into said first chamber.

3. A process according to claim 1, wherein the ratio between the retention capacity of the sorbing medium and the volume of the collected head fraction is higher than 2.

4. A process according to claim 1, wherein the isotopic mixture is injected into the sorbing medium under viscous conditions.

5. A process according to claim 1, wherein the isotopic mixture contains the isotopes of a single element.

6. A process according to claim 1 wherein the isotopic mixture is a natural mixture of isotopes.

7. A process according to claim 1 wherein said first chamber has injected thereinto a head fraction originating from said third chamber situated upstream in said cascade, a heart fraction originating from said first chamber and tail fraction originating from said second chamber situated downstream in said cascade.

8. A process according to claim 5, wherein the isotopic mixture contains the isotopes of an element of the Group III-A.

9. A process according to claim 5, wherein the isotopic mixture contains the isotopes of an element of Group Vb.

10. A process according to claim 5, wherein the isotopic mixture contains the isotopes of an element of Group VI.

11. A process according to claim 5, wherein the isotopic mixture contains the isotopes of an element of the family of rare gases.

12. An apparatus which comprises in combination, a series of columns filled with a sorbing agent and arranged in cascade formation, the outlet of each column being connected by a conduit system:
   (a) to the inlet of the column situated immediately downstream of the column, considered with respect to the sense of enirchment in the least adsorbed isotope,
   (b) to its own inlet,
   (c) to the inlet of a column placed upstream of the column, considered with respect to the sense of enrichment in the least adsorbed isotope,
   (d) to a conduit system for discharge of the buffering gas, the inlet of each column being connected to a conduit system for inert gas, and changeover valves placed at the inlet and at the outlet of each column and permitting the gaseous stream to be directed into the appropriate directions.

13. An apparatus according to claim 12, wherein the changeover valves comprise an electromagnetic control member which receives signals coming from a timing mechanism, which causes the desired changeover operations.

14. A process for enrichment of an isotopic mixture, comprising injecting said isotopic mixture in a gaseous state into a chamber filled with a sorbing medium having a retention capacity and a buffering gas which is inert with respect to said isotopic mixture and said sorbing medium, collecting a first fraction enriched in the least sorbed isotopic species at the outlet of said chamber, said first fraction being called the head fraction, injecting buffering gas into said chamber, collecting a second fraction containing an isotopic ratio substantially equal to the isotopic ratio which was present in the isotopic mixture injected into said chamber, said second fraction being called the heart fraction and collecting a third fraction depleted of said least sorbed isotopic species, said third fraction being called the tail fraction.

References Cited

UNITED STATES PATENTS

| | | | |
|---|---|---|---|
| 2,780,526 | 2/1957 | Fleck | 55—79 |
| 3,002,583 | 10/1961 | Findlay | 55—67 |
| 3,208,197 | 9/1965 | Simon et al. | 55—16 |
| 3,220,164 | 11/1965 | Golay | 55—67 |
| 3,242,645 | 3/1966 | Montgareuil et al. | 55—68 |
| 3,324,628 | 6/1967 | Natelson | 55—67 |

REUBEN FRIEDMAN, Primary Examiner

C. H. HART, Assistant Examiner

U.S. Cl. X.R.

55—67, 74, 179